Jan. 25, 1949.  G. W. LAUTRUP ET AL  2,460,017
MOVING STAIRWAY BRAKE
Filed June 6, 1946  3 Sheets-Sheet 2

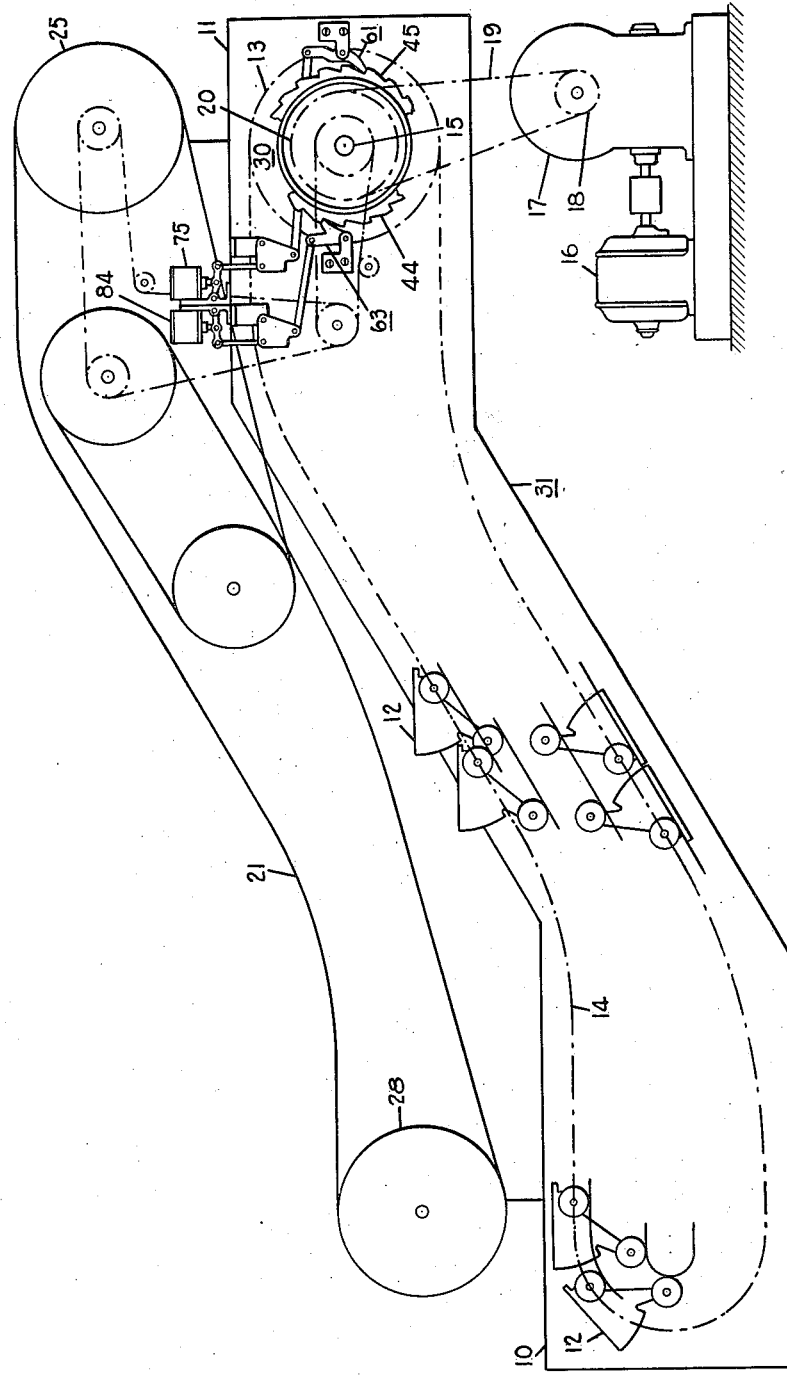

George William Lautrup
John Norman Anderson  INVENTORS
BY Walter E. Bradley  ATTORNEY Jan. 25, 1949.  G. W. LAUTRUP ET AL  2,460,017
MOVING STAIRWAY BRAKE
Filed June 6, 1946  3 Sheets-Sheet 3

George William Lautrup
John Norman Anderson   INVENTORS
BY Arthur R. Bradley   ATTORNEY Patented Jan. 25, 1949

2,460,017

UNITED STATES PATENT OFFICE 2,460,017

MOVING STAIRWAY BRAKE

George William Lautrup, Yonkers, N. Y., and John Norman Anderson, Hoboken, N. J., assignors to Otis Elevator Company, New York, N. Y., a corporation of New Jersey Application June 6, 1946, Serial No. 674,738

4 Claims. (Cl. 188—69)

The invention relates to moving stairway brakes and to the control thereof.

Moving stairways are provided with brakes which act, when the supply of power to the driving motor is discontinued, to bring the stairway to a stop. The discontinuance of the power supply to the driving motor is usually not only effected by manual control but also by the operation of various safety devices. Also power failure may occur. Thus, the power supply may be discontinued under conditions where persons are using the stairway. It is desirable when this occurs that the stairway be brought to a stop without throwing passengers off balance.

It is the object of the invention to provide braking apparatus which, upon the discontinuance of the power supply, acts to apply an initial braking force and after a certain time interval to apply additional braking force, the force of which combined with the initial braking force is sufficient to stop the stairway regardless of the load thereon.

In the arrangement which will be described, the brake is of the pawl operated type. A pair of brake rings with ratchet teeth is provided and an operating pawl is provided for each brake ring. During running of the stairway, the pawls are held in retracted positions disengaging the brake rings and these rings and other parts of the brake apparatus rotate as a unit through a clutch action. Upon the discontinuance of the power supply to the driving motor for any reason, the pawls are freed for engaging the respective brake rings, one pawl being freed first and the second upon the expiration of a certain time interval thereafter. If the stairway is descending at the time, the first pawl engages a tooth on the brake ring for which it is provided to bring the ring to a stop. As a result, a certain braking force is exerted which is sufficient to effect a gradual stop of the stairway within the time interval, if lightly loaded. If the stairway is still descending when the second pawl is freed, this pawl engages a tooth on the brake ring for which it is provided to bring the ring to a stop. As a result, additional braking force is provided which, with the force due to the stopping of the first ring, is sufficient to bring the stairway to a gradual stop, even if heavily loaded. In this way, the possibility of throwing passengers off balance is minimized. If the stairway is ascending at the time, the pawls do not engage the teeth to bring the stairway to a stop but the time interval is of such duration that both pawls will be in condition to engage the teeth of the rings and thus prevent appreciable downward movement of the stairway, should the load on the stairway be such as to cause reversal to take place. In the preferred arrangement, each pawl is provided with a hold-off shoe to prevent the pawl, when freed under conditions where the stairway is ascending, engaging the ring teeth until after the stairway has ceased its upward movement.

Features and advantages of the invention will be seen from the above statements and from the following description and appended claims.

In the drawings:

Figure 1 is a diagrammatic representation in side elevation of a moving stairway embodying the invention;

Figures 2, 3:
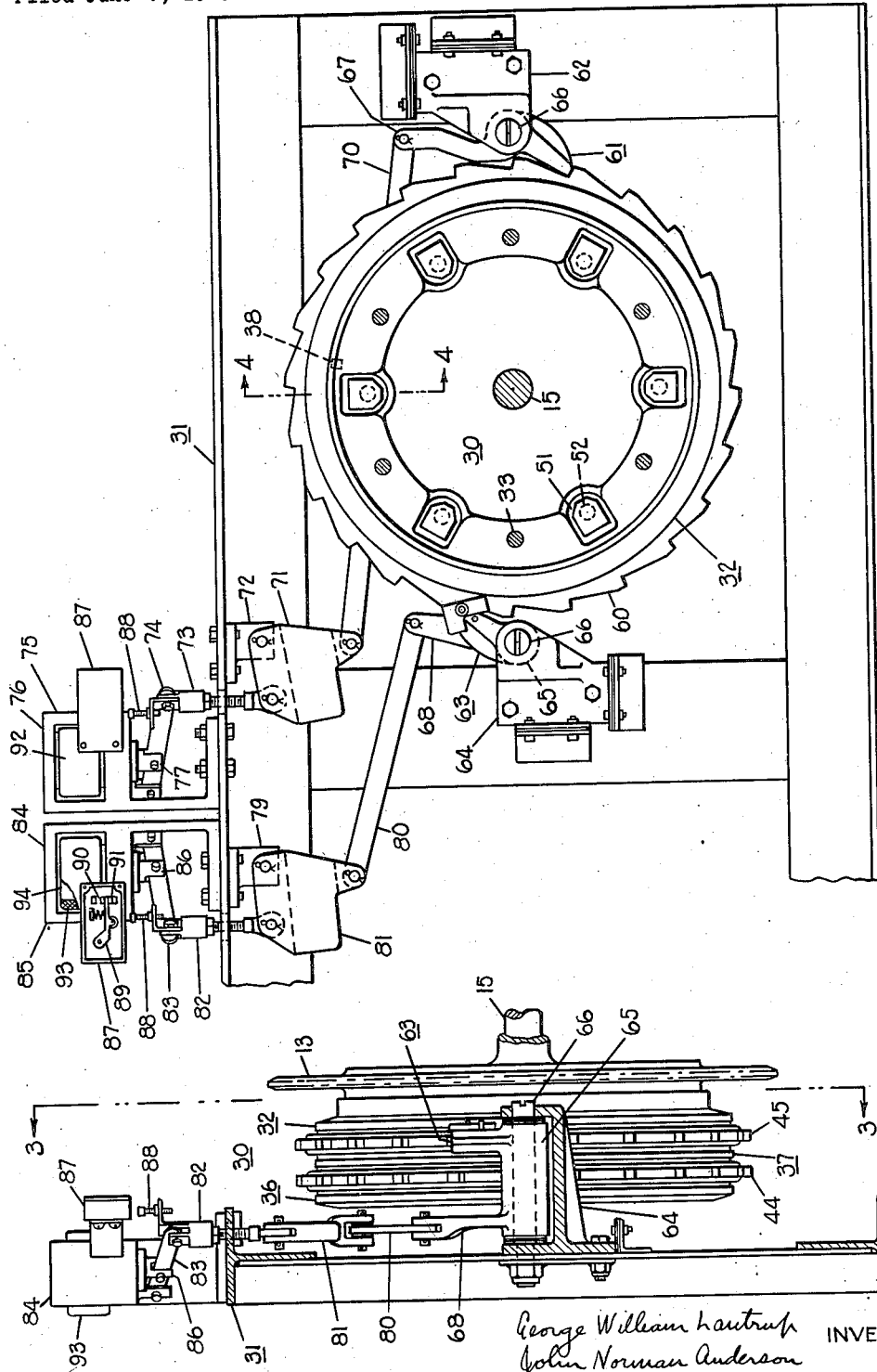
Figure 2 is an end view, with parts in section, of the stairway brake of Figure 1.
Figure 3 is a side view of the same, in section taken along the line 3—3 of Figure 2.
Figure 4:
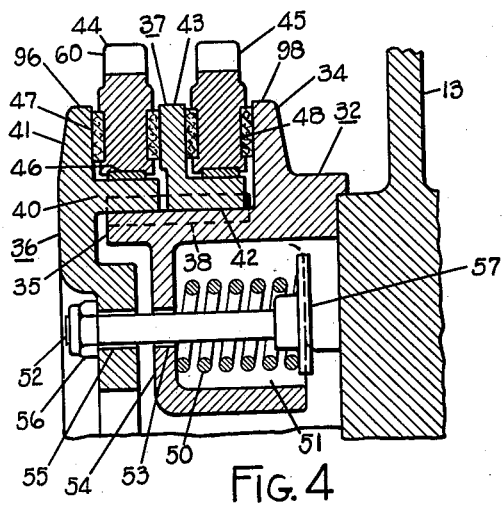
Figure 4 is a view in section taken along the line 4—4 of Figure 3.

Referring to Figure 1, the moving stairway extends between a lower landing 10 and an upper landing 11. It comprises an endless series of steps 12 driven at the upper end of the stairway by means of sprocket wheels through running gear chains, a sprocket wheel and chain being arranged on each side of the stairway. A sprocket wheel and running gear chain are illustrated diagrammatically for one side of the stairway, the sprocket wheel being designated 13 and the chain 14. The sprocket wheels are mounted on and driven by the main drive shaft 15 of the stairway. This drive shaft, in turn, is driven by an electric motor 16, through reduction gearing 17, sprocket wheel 18, driving chain 19 and sprocket wheel 20 secured to shaft 15, chain 19 and wheels 18 and 20 also being diagrammatically illustrated.

The stairway has two endless moving handrails, one at each side thereof, operating at substantially the same speed as the steps. The handrail 21 for one side of the stairway is shown and is diagrammatically illustrated as driven from main drive shaft 15.

The stairway is provided with a break which acts on the main drive shaft 15 and is designated as a whole as 30. Details of the brake are illustrated in Figures 2 to 6 inclusive to which reference may now be had.

As illustrated in Figure 2, the brake is associated with the sprocket wheel 13 on one side of the stairway, being interposed between the sprocket wheel and the stairway trust 31. The brake comprises a mounting ring 32 secured to sprocket wheel 13 as by bolts 33. Ring 32 is formed with a flange 34 and a barrel portion 35 which extends from the flange toward the truss. This barrell portion forms a support for the pressure ring 36 and an intermediate ring or annulus 37. The pressure ring and annulus are driven from the mounting ring through a key 38, being slidable on the mounting ring. The pressure ring is formed with a cylindrical portion 40 which fits onto the barrel portion 35 and a flange 41 coextensive with flange 34. Annulus 37 is formed with a like cylindrical portion 42 and flange 43. Arranged on cylindrical portion 40 between flanges 41 and 43 is a brake ring 44. A like brake ring 45 is arranged on cylindrical portion 42 between flanges 43 and 34. Each brake ring is provided with an inner bushing 46 which fits on the cylindrical portion on which the brake ring is mounted to form a bearing for rotative movement of the cylindrical portion with respect to the brake ring when the brake ring is held against movement. Each brake ring is also provided on each side thereof with a friction lining 47, preferably in the form of a plurality of segments embedded in pockets 48 formed in the sides of the brake ring. These segments act when the brake ring is free to rotate to provide a frictional driving relationship between the ring and the adjacent flanges and when the ring is stopped to exert a braking force against the flanges. A plurality of springs 50 are arranged in pockets 51 formed inside the barrel of the mounting ring. Each of these springs is arranged on a bolt 52, the threaded end of which extends through aperture 53 in the base 54 of the pocket and aperture 55 in the pressure ring 35 where it is provided with a nut 56. The springs are compressed between the bases 54 and spring seats 57 formed on head ends of the bolts and act to push the pressure plate toward the mounting ring, clamping the brake rings between the flanges to be driven by the sprocket wheel through a clutch action and to cause a braking force to be exerted on the flanges through the friction linings when a brake ring is stationary and the rings on which the flanges are formed are turning. The amount of braking force is adjusted by adjusting nuts 56.

Each brake ring is provided with a plurality of ratchet teeth 60 extending in a direction for engagement by a pawl to prevent rotation of the ring in the direction for downward movement of the stairway. These pawls are preferably positioned on opposite sides of the main drive shaft as illustrated. The pawl 61 for brake ring 44 is pivotally mounted on a bracket 62 secured to the truss framework while the pawl 63 for brake ring 45 is pivotally mounted on a bracket 64, also secured to the truss framework. Each of these pawls is formed on a hub 65 through which the pivot pin 66 for the pawl extends. An operating arm for the pawl is also formed on the hub, the operating arm for pawl 61 being designated 67 and that for pawl 63 being designated 68. Arm 67 is connected by a link 70 to a weighted bell crank 71 pivotally supported by a bracket 72 mounted on an upper member of the truss framework. The bell crank in turn is connected by an adjustable link 73 to a lever 74. This lever in turn is connected to the movable core 77 of an electromagnet 75. This electromagnet is supported in a frame 76 mounted on the truss framework. The other end of the lever is pivotally supported on the frame 76, the core 77 being connected to a mid point on the lever. Similarly, arm 68 is connected by a link 80 to a weighted bell crank 81 pivotally supported by a bracket 79 mounted on the same member of the truss but spaced from bracket 72. Bell crank 81 is connected by link 82 to lever 83 which in turn is connected at a mid point to the movable core 86 of an electromagnet 84. The electromagnet is supported by a frame 85 mounted on the truss framework beside frame 76. The lever 83 is pivotally supported on frame 85, levers 74 and 83 extending in different directions. With this construction, each electromagnet when energized acts through its core to pull the pawl connected thereto into retracted position disengaging the brake ring and to hold the pawl in that position.

Each of levers 74 and 83 is arranged to operate switching mechanism, this mechanism being located in a housing 87 having an opening through which an abutment operating screw 88 mounted on the lever may pass. The cover for the housing for the switching mechanism operated by lever 83 has been shown removed in order to show the switching mechanism. A switch arm 89 is pivotally mounted in the housing and has an operating roller to be engaged by the abutment screw. The switch arm is biased by a spring against movement by the abutment screw. The switch is indicated as of the make and break type, the making contacts being designated 90 and the breaking contacts being designated 91. The switching mechanism for operation by lever 74 is not shown but may be of the same arrangement, although in the preferred control circuits a single make type is utilized. Electromagnet 75 may have a single magnet coil 92 while electromagnet 84 has preferably two coil portions, either in the form of separate coils 93 and 94 as indicated or in the form of one coil with a connecting tap.

Figure 5:
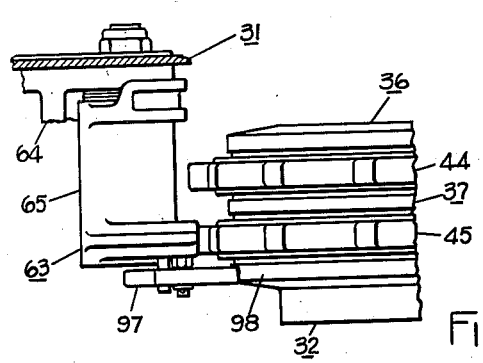
Figure 5 is an enlarged detail, with parts broken away of a portion of the brake mechanism as viewed from the top.
Figure 6:
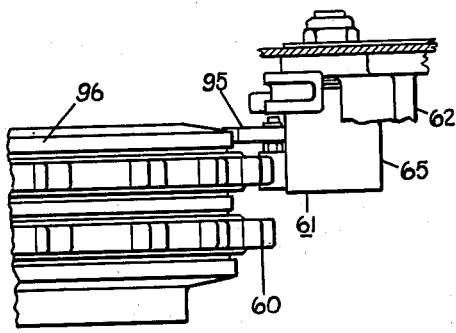
Figure 6 is a side view of the same, with parts omitted.

As illustrated in Figures 5 and 6, pawl 61 carries a pivoted shoe 95 in position opposite the rim 96 of flange 41. Similarly pawl 63 carries a pivoted shoe 97 in position opposite the rim 98 of flange 34. Each shoe is formed of two arms, one arm for engaging a pin 100 carried by the pawl. The shoe is biased by weight distribution in a direction so that the other arm 101 of the shoe extends toward the rim. When the stairway is ascending the brake rings are rotating in the direction of the arrow marked "up" in Figure 6, and when the stairway is descending the brake rings are rotating in the direction of the arrow marked "down." When an electromagnet releases its core, the pawl connected thereto is moved by the weighted bell crank in a direction for engaging ratchet teeth. In the initial movement of the pawl, the arm 101 of its shoe engages the rim. Should the moving stairway be descending at the time electromagnet 75 releases its core, the arm 101 of shoe 95 engages rim 96 as pawl 61 moves toward brake ring 44. The frictional force thereupon exerted by the rim on arm 101 swings the shoe into position to permit continued movement of the pawl into position to engage a ratchet tooth. Similarly, if the stairway is still descending at the time electromagnet 84 releases its core, shoe 97 is similarly swung into position to enable pawl 63 to move into position to engage a ratchet tooth. When the stairway is ascending, the shoe for each pawl, when the pawl is freed by its electromagnet, engages the rim and is held in position against the pin 100 by the frictional force exerted thereon by the rim. The arm 101 is of such length as to prevent the pawl engaging the ratchet teeth so long as the shoe is maintained in this position. This obviates the pawls bouncing over the teeth, with attendant noise and unnecessary wear of the various operating parts. Should the stairway start to move downwardly after ascending movement stops, the shoes are swung in the other direction about their pivots, permitting the pawls to engage the ratchet teeth.

Figure 7:
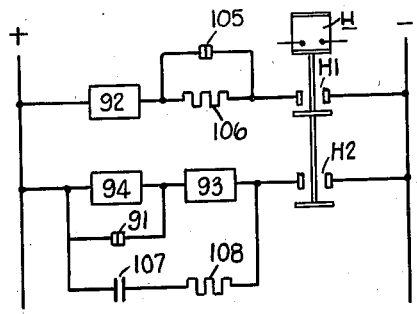
Figure 7 is an across-the-line wiring diagram of a portion of the control circuits for the stairway directed to the control of the brake.

Reference may now be had to Figure 7 which illustrates controlling circuits for the coils 92, 93 and 94 of the electromagnets. The coils of these electromagnets are subject to a switch H which is operated to engage its contacts incident to the starting of the stairway in either direction. This switch is further controlled so as to drop out to separate its contacts upon the discontinuance of the power supply to the stairway driving motor. Contacts 105 are separated when the coil 92 of electromagnet 75 is energized to retract pawl 61, these contacts being either contacts of the switching mechanism in housing 87 or contacts of a relay controlled by this switching mechanism. The outer coil 93 alone of electromagnet 84 is strong enough when energized to retract pawl 63. Contacts 91 of the switching mechanism operated by electromagnet 84 separate as the pawl is retracted to remove a short circuit for the inner coil 94. The outer coil is of relatively heavy wire while the inner coil is of relatively fine wire of a larger number of turns. The insertion of the inner coil in series with the outer coil reduces the ampere turns of the electromagnet to a point still sufficient to hold the pawl released, but without dissipating energy. When the circuit for coil 93 is completed, a circuit is also completed for charging a condenser 107, this circuit being through resistance 108 to limit the initial charging current. When the external supply of current to coils 93 and 94 is discontinued from any cause, including failure of power, the condenser discharges into these coils to supply sufficient current thereto to hold core 86 in attracted position and thus maintain pawl 63 retracted for a certain time interval. The relatively large number of turns added by coil 94 to those of coil 93 enables a time interval of the desired duration to be obtained with a condenser which is not prohibitively large.

In operation, when the moving stairway is idle, the pawls 61 and 63 are in engagement with ratchet teeth as illustrated for example in Figure 3. Upon operation of switch H incident to the starting of the moving stairway, contacts H1 and H2 engage, completing the circuits for the coils 92 and 93 respectively. As a result, the electromagnets 75 and 84 act to attract their cores 77 and 86. This movement is transmitted through the levers and linkage connecting the pawls 61 and 63 to cores 77 and 86 respectively to move the pawls about their pivots into positions to clear the ratchet teeth. Should the stairway be started for operation in the down direction, a short initial movement of the stairway in the up direction is effected to enable the pawls, if wedged against teeth, to be disengaged from the ratchet teeth before circuits are established for downward movement, similar to the usual manner of controlling single pawl brakes. When the pawls are retracted, their respective switching mechanisms are operated resulting in the separation of contacts 105 to insert resistance 106 in series with coil 92 and in the separation of contacts 91 to insert coil 94 in series with coil 93. Also the engagement of contacts H2 completes the charging circuit for condenser 107.

With the pawls retracted, the brake rings are rotated with the sprocket, mounting ring and pressure ring through a clutch action. Should a stop button be operated to stop the stairway, or should a safety device operate, switch H is dropped out to separate contacts H1 and H2. This disconnects coils 92, 93 and 94 from the supply lines. The core of electromagnet 75 is released immediately but condenser 107 discharges into coils 93 and 94 to maintain sufficient energization thereof to prevent the immediate release of the core of electromagnet 84. This is true also in case of power failure.

Assume that the moving stairway has been descending. The release of the core of the electromagnet 75 permits the weighted bell crank 71 to act through link 70 and operating arm 67 to rotate pawl 61 about its pivot into position to engage one of the ratchet teeth 60 on the rim of brake ring 44, the shoe 95 being swung out of the way immediately that it engages the rim 96. Upon the engagement of the pawl with a ratchet tooth, rotary movement of the brake ring is immediately stopped with the result that a braking force is exerted through the friction linings 47 on the flanges 41 and 43 for stopping the stairway. Upon the expiration of a certain time interval, the condenser 107 discharges to a point where the electromagnet 84 is no longer capable of maintaining its core in attracted position. As a result, the core is released and the weighted bell crank 81 acts through link 80 and operating arm 68 to move pawl 63 about its pivot in a direction toward the brake ring 45. If the stairway has been brought to a stop by the braking force exerted as a result of the stopping of brake ring 44, the movement of the pawl is stopped upon the engagement of shoe 97 with rim 98. However, should the stairway still be descending at the time this movement of pawl 63 takes place, shoe 97 is immediately swung out of the way as it engages rim 98, permitting the pawl to engage one of the teeth 60 on brake ring 45. As this engagement takes place, the ring is brought to an immediate stop and an additional braking force is exerted through the friction linings upon flanges 34 and 43 to bring the stairway to a stop. The combined braking forces due to the stopping of both brake rings is sufficient to bring the stairway to a stop regardless of load.

Should the stairway have been ascending at the time of the discontinuence of the supply of current from the supply lines to the coils of the electromagnets, no braking action is exerted by the braking mechanism and the stairway coasts to a stop. Pawl 61 does not move into engagement with its brake ring on the release of core 77, being held off by the action of shoe 95. Similarly, shoe 97 holds pawl 63 off its brake ring on release of core 86 by electromagnet 84 upon the expiration of the time interval, this time interval expiring before the stairway coasts to a stop even though heavily loaded. Thus, when the stairway comes to a stop, both pawls are in condition to move into engagement with teeth on their brake rings should the stairway because of the load thereon start to move downwardly. Should this downward movement occur, the pawls engage teeth on the brake rings during the initial downward movement to prevent any appreciable downward movement of the stairway.

Thus it seen that braking apparatus is provided for a moving stairway in which an initial braking force is applied to stop a descending stairway and, if the stairway is not brought to a stop within a certain time interval, an additional braking force is applied. The amount of the initial braking force is such as to effect the stopping of the stairway, if the load thereon does not exceed a certain amount, at a retardation rate which minimizes the possibility of passengers being thrown off balance. The amount of the total braking force when the additional braking force is applied is such as to effect the stopping of the stairway if heavily loaded at a comparable retardation rate. This arrangement insures the stairway being brought to a stop but without the application of a braking force which might cause an abrupt stop.

It will also be seen that a simple and economical arrangement is provided for applying the braking force in steps. Various changes in the construction and control of the brake may be made. For example, the brake may be arranged to be applied in a greater number of steps. Also, different timing arrangements may be employed but the one illustrated has the advantage of providing timing in case of power failure.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Braking apparatus comprising; a plurality of rotatable members; a plurality of brake members alternately positioned between said rotatable members and in frictional engagement therewith to be rotated thereby; stopping means for each of said brake members for engaging the same to stop rotation thereof; an electromagnet for each stopping means for disengaging it from the brake member for which it is provided; and means for causing said stopping means to engage said brake members in timed sequence.

2. Braking apparatus comprising; a plurality of rotatable coaxial rings; a plurality of brake rings, one less than the number of coaxial rings, alternately mounted between said coaxial rings, each brake ring having a plurality of circumferential teeth thereon; means for yieldably clamping said brake rings between said coaxial rings for rotation therewith; a pawl for each of said brake rings for engaging a tooth thereon to stop the brake ring when the coaxial rings are rotating in a certain direction; an electromagnet for each pawl for moving the pawl to and holding it in retracted position disengaged from the teeth of the brake ring for which it is provided; means for each pawl for biasing it to tooth engaging position; and means for causing said pawls to move into tooth engaging position in timed sequence, whereby when the coaxial rings are rotating in said certain direction the braking action is exerted in steps.

3. Braking apparatus comprising; three spaced coaxial rings rotatable as a unit; two brake rings alternately mounted between said coaxial rings, each brake ring having a plurality of ratchet teeth on the periphery thereof extending in the direction of rotative movement of said coaxial rings in a certain direction; friction facings for the sides of said brake rings for engaging said coaxial rings; means for yieldably clamping said brake rings between said coaxial rings; a pawl for each of said brake rings for engaging a tooth thereon; an electromagnet for each pawl for moving the pawl to and holding it in retracted position disengaged from the ratchet teeth of the brake ring for which it is provided; means for each pawl for biasing it to tooth engaging position; means for each pawl for preventing its moving into tooth engaging position except when there is rotative movement of said coaxial rings in said certain direction; and means for causing said pawls to move into tooth engaging position in timed sequence, whereby when said coaxial rings are rotating in said certain direction the braking action is exerted in steps.

4. Braking apparatus comprising; rotatable means; a brake ring frictionally driven by said rotatable means, said brake ring having a plurality of ratchet teeth extending in one direction of rotative movement of said rotatable means; a pawl biased to engage said teeth; an electromagnet adapted upon energization to retract said pawl from said teeth; and means rendered effective upon deenergization of said electromagnet for holding the pawl off the teeth except when there is movement of said rotatable means in said one direction.

GEORGE WILLIAM LAUTRUP.
JOHN NORMAN ANDERSON.

REFERENCES CITED

The following references are of record in the file of this patent:

UNITED STATES PATENTS

| Number | Name | Date |
|--------|------|------|
| 767,742 | Ferguson | Aug. 16, 1904 |
| 960,055 | Sundh | May 31, 1910 |